Patented Aug. 23, 1932

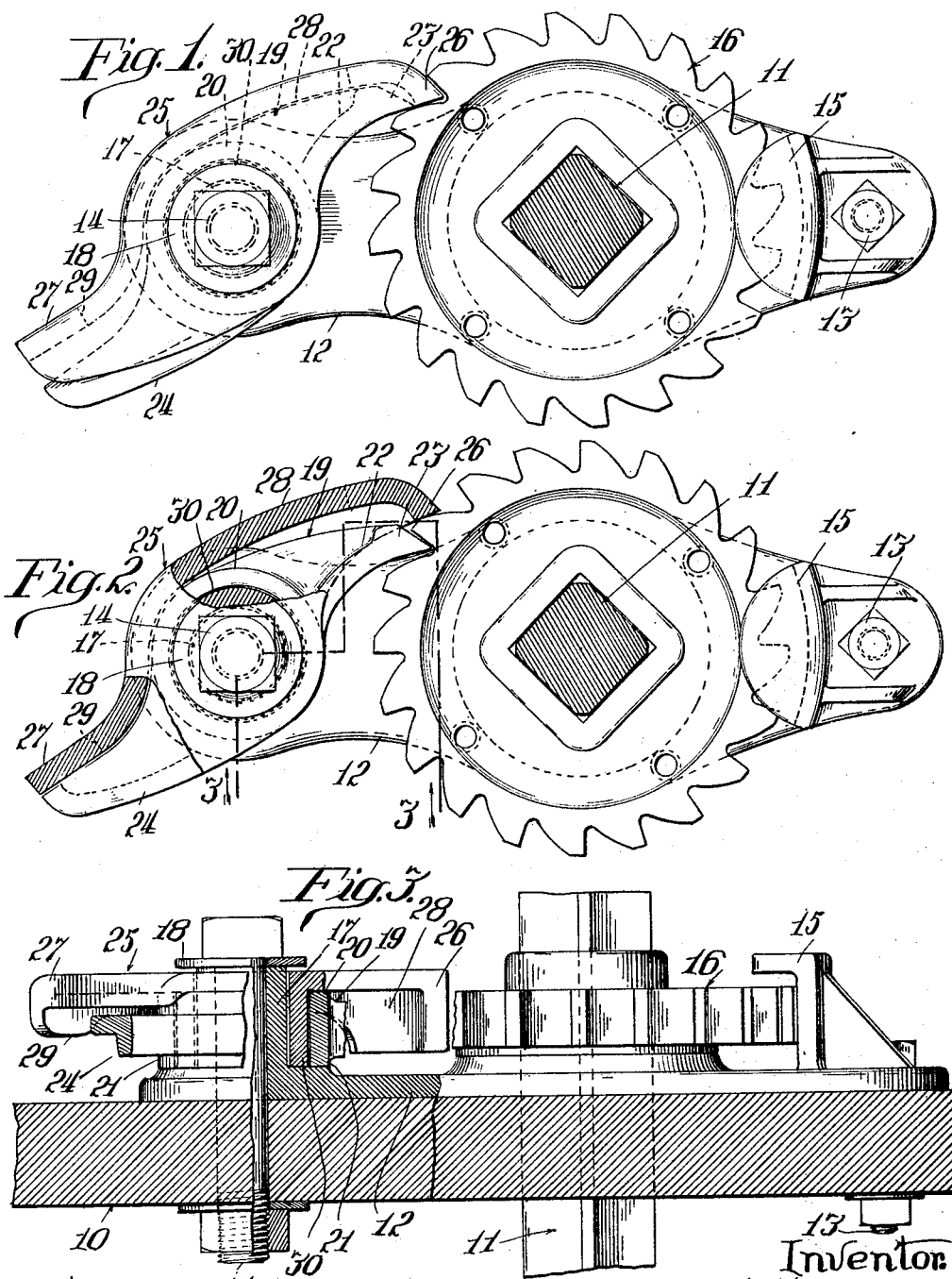

1,873,706

UNITED STATES PATENT OFFICE

VICTOR H. HARBERT, OF CHICAGO, ILLINOIS, ASSIGNOR, BY MESNE ASSIGNMENTS, TO TRANSERV CORPORATION, A CORPORATION OF ILLINOIS

HAND BRAKE PAWL

Application filed January 28, 1929. Serial No. 335,696.

My invention relates to pawls which are especially adapted for use in connection with the hand brake operating mechanism of railroad cars and particularly on freight cars; that is to say, a pawl which is employed for locking or holding the hand operated brakestaff against reverse rotation during brake applying operations.

My invention has for its object the provision of a brake-staff ratchet holding means which will enable the take-up winding of the brake chain about the staff to be accomplished to a fuller extent than may be done with the ordinary pawl at present employed. That is to say, my improved means involves an auxiliary ratchet engaging member adapted to follow the travel of the toe of the pawl proper so as to interengage the ratchet tooth last engaged by the pawl proper and thus prevent any unwinding movement or rotation of the ratchet and brake-staff.

The objects of my invention and its advantages will all be readily comprehended from the detailed description of the accompanying drawing, wherein:—

Figure 1 is a plan view of my improved pawl showing the outer member or pawl in engagement with a brake-staff ratchet; the brake-staff being shown in section.

Figure 2 is a similar view illustrating the inner pawl in engagement with the ratchet; a portion of the outer pawl being broken away and shown in section to more clearly show its construction.

Figure 3 shows the structure in elevation, with portions broken away and parts shown in section.

My improved pawl is especially intended for use in connection with the hand operated brakes of railroad freight cars which are usually provided at the ends and adjacent to the tops with a foot-board, a portion whereof is shown at 10 in Figure 3. The foot-board 10 is provided with a suitable opening for passage of the brake-staff therethrough; a portion of the brake-staff being shown at 11.

The foot-board 10 is usually provided with what is known as a pawl-plate 12, which has an opening adapted to register with the opening in the foot-board for passage of the brake-staff. The pawl-plate is secured in place on the foot-board by means of bolts 13, 14 arranged at opposite ends of the plate 12. One end of the plate on its upper surface is provided with an upwardly and thence laterally disposed lug 15.

The lateral portion overhangs the ratchet 16 and prevents upward movement of the ratchet. The opening in the pawl-plate 12 is preferably formed to receive a portion of the hub of the ratchet 16. The end of the pawl-plate secured by the bolt 14, at a predetermined distance removed from the brakestaff and ratchet-hub receiving opening, is provided with an upstanding trunnion 17 (see Figure 3) through which bolt 14 extends; the bolt immediately above the trunnion being provided with a washer 18 of size sufficient to overhang the trunnion so as to hold the pawls in place against upward movement.

My invention involves what may be termed the main member or pawl 19 which, at an intermediate point, is provided with an opening therethrough of a diameter greater than the diameter of the upstanding pawl-plate trunnion 17 for reason later apparent; the opening being preferably surrounded on opposite faces of the pawl by the annular ribs 20, 21, in order that proper and free rotative relation between the mechanism may be maintained.

The member 19 comprises the radially extending and preferably somewhat arcuately formed toe portion 22 terminating in the slightly sloping toe or ratchet tooth engaging tip 23; and the heel portion 24 which is shown somewhat curved in a direction opposite to that of the toe portion 22 and radiating from the opposite side of the pivot-receiving center of the member 19.

The tip 23 is shown in Figure 2 in holding engagement with a tooth of ratchet 16; while in Figure 1 it is shown riding substantially midway on the next succeeding tooth of the ratchet.

Concentrically mounted on the same pawlplate trunnion 17 is an auxiliary or second member 25 having substantially the same shape as the first or main pawl member 19. That is to say, the member 25 comprises a toe or ratchet tooth engaging tip 26 and a heel 27, which are given an arcuate formation substantially similar to that of member 19, except that the toe portion 26 of member 25 is slightly longer than toe 22 of member 19 so as to extend beyond the tip 23 of member 19.

The toe 26 of member 25 is shown preferably provided with a vertically disposed rib 28 adapted to lap what may be termed the rear side of tip 23 of member 19 and thus prevent rotation or movement of member 25 in advance of member 19 relative to the advancing teeth of the ratchet 16, so that a lapping relation of the tips 23 and 26 may be had as shown in Figure 1 where the tip 26 of the second or auxiliary member 25 is in ratchet-tooth engaging position while tip 23 of member 19 is substantially midway on the next succeeding ratchet-tooth. With the members in the position just described, the tip 23 of toe 22 is substantially in abutting relation with the downwardly extending rib 28 so that too far improper movement of the toe 22 of pawl member 19 away from the ratchet 16 is impossible. The two members being positioned, as just described, brings the heels 24 and 27 of the two members in the spaced relations shown in Figure 1.

That is to say, the distance between the heels of the members is slightly greater than the distance from the tip 23 and the edge or point of the succeeding ratchet tooth on which the tip 23 is riding.

It is apparent that slight additional clockwise rotation of the ratchet 16 in Figure 1 will cause tip 23 of member 19 to engage the next succeeding tooth, at which time the heel portions of both members 19 and 25 will be in substantially parallel lapping relation as shown in Figure 2, while the toe 26 of auxiliary member 25 will have moved to a point substantially midway of the back of the tooth engaged by the tip 23 of member 19.

The heel 27 of member 25 adjacent to its outer end is preferably provided with a depending lip or lug at 29 which is adapted to engage with and lap the side of heel 24 of member 19 and prevent too far improper rotation of member 25 relative to member 19. In other words, the rib 28 and lip or lug 29 maintains the normal relation between the two members.

Member 25 is provided with the depending hub 30 which is adapted to fit into the aperture of member 19 and is apertured to receive the trunnion 17 of the pawl-plate 12; thus permitting oscillatory movement of member 19 about hub 30 of member 25 which in turn oscillates about trunnion 17 which constitutes the common pivot point for both members 19 and 25.

It is evident that a more complete winding of the brake chain may be accomplished than has heretofore been possible with the ordinary pawl and that the brake-staff with its ratchet may be held in such complete chain wound position as is clearly shown in Figure 1, where the usual or main pawl 19 is out of ratchet holding position.

The ratchet 16, however, is held in its complete chain take-up position by the auxiliary pawl member 25, with the result that the desired brake setting condition is maintained.

In other words, the action of my invention is equivalent to the doubling of the number of teeth on the ratchet; a condition, however, which is not practicable, as it is not feasible to make ratchet teeth finer than is usual because they would be of insufficient strength and would also fill up with snow, ice and dirt and thus be absolutely useless and therefore the ratchet must be of the standard type approved by the railroads.

With the lip 29 on the heel of the auxiliary member 25, both members 19 and 25 are moved out of contact with the ratchet when the brakeman kicks the heel of the auxiliary member 25; in addition to the fact that the lip prevents improper reverse rotation of the auxiliary member; while the flanged or ribbed toe or tip portion of the auxiliary member maintains the normal position or relation of both members.

I have shown what I believe to be the simplest and best embodiment of my invention, which has been described in terms employed merely as terms of description and not as terms of limitation, as structural modifications may be made without, however, departing from the spirit of my invention.

What I claim is:—

1. A hand brake pawl comprising, in combination with a ratchet member, a pair of ratchet engaging members arranged in superposed relation with a common pivotal point, the upper member having a ratchet engaging end disposed beyond the ratchet engaging end of the lower member and provided with a depending portion adapted to control the position of the lower member, whereby movement of the lower member out of contact with the ratchet member is prevented while the upper member is in ratchet holding position and the lower member is free to move into holding engagement with a succeeding tooth of the ratchet member, and means whereby the upper member is held in position for holding engagement with a tooth of the ratchet member while the lower member is moving into holding engagement with the succeeding tooth and whereby both members may simultaneously be moved away from the ratchet member.

2. A hand brake pawl comprising, in combination with a ratchet member, a pair of pawls arranged in superposed relation with a common pivotal point, the upper member having a depending hub, while the lower pawl member is oscillatably mounted on the hub of the upper pawl member, the upper pawl having a ratchet engaging end disposed beyond that of the lower pawl and provided with a depending flange on the side of the upper pawl disposed away from the ratchet member whereby the lower pawl is free to move into holding engagement with a succeeding tooth but is held against movement out of contact with the ratchet member, while the upper pawl is in ratchet holding position, both pawls being provided with heel portions and the heel of the upper pawl having a depending lug adapted to engage with the heel of the lower pawl whereby the upper pawl is held in position for contact with the preceding tooth while the lower pawl is in engagement with a succeeding tooth and whereby both pawls may simultaneously be moved away from the ratchet member.

VICTOR H. HARBERT.